US012358110B2

(12) United States Patent
Shioya et al.

(10) Patent No.: US 12,358,110 B2
(45) Date of Patent: Jul. 15, 2025

(54) DRIVING TOOL

(71) Applicant: Koki Holdings Co., Ltd., Tokyo (JP)

(72) Inventors: Koji Shioya, Ibaraki (JP); Takashi Ueda, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 732 days.

(21) Appl. No.: 17/434,292

(22) PCT Filed: Mar. 6, 2020

(86) PCT No.: PCT/JP2020/009809

§ 371 (c)(1),
(2) Date: Aug. 26, 2021

(87) PCT Pub. No.: WO2020/203056

PCT Pub. Date: Oct. 8, 2020

(65) Prior Publication Data

US 2022/0134524 A1 May 5, 2022

(30) Foreign Application Priority Data

Mar. 29, 2019 (JP) ................................ 2019-065649

(51) Int. Cl.
*B25C 1/04* (2006.01)
*B25C 1/00* (2006.01)
*B25C 1/06* (2006.01)

(52) U.S. Cl.
CPC .............. *B25C 1/047* (2013.01); *B25C 1/008* (2013.01); *B25C 1/06* (2013.01)

(58) Field of Classification Search
CPC ............ B25C 1/06; B25C 1/008; B25C 1/047
See application file for complete search history.

(56) References Cited

U.S. PATENT DOCUMENTS

2009/0090759 A1 4/2009 Leimbach et al.
2017/0190037 A1* 7/2017 Sato .......................... B25C 1/06

(Continued)

FOREIGN PATENT DOCUMENTS

JP 2018-034258 A 3/2018
WO 2016/199670 A1 12/2016

(Continued)

OTHER PUBLICATIONS

International Search Report issued in PCT/JP2020/009809, dated May 26, 2020 w/English Translation.

(Continued)

*Primary Examiner* — Anna K Kinsaul
*Assistant Examiner* — Himchan Song
(74) *Attorney, Agent, or Firm* — Rimon P.C.

(57) ABSTRACT

A driving tool capable of making a second engaging portion engage with a first engaging portion which is an original engaging target when a rotating portion is rotated in a state where a striking unit is stopped between a first position and a second position is provided. The driving tool includes a striking unit 12, a wheel 50 configured to actuate the striking unit 12, a plurality of first engaging portions provided on the striking unit 12, and a plurality of second engaging portions provided on the wheel 50. The plurality of first engaging portions includes first engaging portions 61 and 62 and first engaging portions 63 to 71. The plurality of second engaging portions includes a second engaging portion 51 engaging with the first engaging portions 61 and 62 when the wheel 50 is rotated in a state where the striking unit 12 is stopped at the second position and second engaging portions 52 to 60 engaging with the first engaging portions 63 to 71 when the wheel 50 is rotated in a state where the striking unit 12 is stopped at the second position. An adjustment mechanism 17, which makes the second engaging portion 51 engage (Continued)

with the first engaging portions 61 and 62 and makes the second engaging portions 52 to 60 engage with the first engaging portions 63 to 76 when the wheel 50 is rotated in a state where the striking unit 12 is stopped between the first position and the second position, is provided.

12 Claims, 13 Drawing Sheets

(56) References Cited

U.S. PATENT DOCUMENTS

| | | | | |
|---|---|---|---|---|
| 2018/0154505 | A1* | 6/2018 | Sato | B25C 1/047 |
| 2020/0164498 | A1* | 5/2020 | Wechselberger | B25C 1/047 |
| 2021/0031347 | A1 | 2/2021 | Sato et al. | |
| 2021/0101272 | A1 | 4/2021 | Saitou et al. | |
| 2021/0138622 | A1 | 5/2021 | Enta et al. | |

FOREIGN PATENT DOCUMENTS

| | | | |
|---|---|---|---|
| WO | 2018/180082 | A1 | 10/2018 |
| WO | 2018/198670 | A1 | 11/2018 |

OTHER PUBLICATIONS

The First Office Action issued in corresponding Chinese Patent Application No. 202080017142.2, dated Sep. 25, 2023 w/English MT.

* cited by examiner

12: STRIKING UNIT
17: ADJUSTMENT MECHANISM
50: WHEEL
51-60: SECOND ENGAGING PORTION
61-71: FIRST ENGAGING PORTION
D1: FIRST DIRECTION
D2: SECOND DIRECTION

DRIVING TOOL

CROSS REFERENCE TO RELATED APPLICATIONS

This application is the U.S. National Phase under 35 U.S.C. § 371 of International Application No. PCT/JP2020/009809, filed on Mar. 6, 2020, which claims the benefit of Japanese Application No. 2019-065649, filed on Mar. 29, 2019, the entire contents of each are hereby incorporated by reference.

TECHNICAL FIELD

The present invention relates to a driving tool including a striking unit configured to strike a fastener.

BACKGROUND ART

An example of a driving tool including a striking unit configured to strike a fastener is described in Patent Document 1. The driving tool described in Patent Document 1 includes an electric motor, a striking unit, a pressure accumulation chamber, a power mechanism, an ejection unit, a magazine, and a trigger. The striking unit has a piston that receives a gas pressure of the pressure accumulation chamber and a driver blade that is fixed to the piston. The striking unit can be actuated between a first position and a second position. The driver blade has a plurality of first engaging portions. The plurality of first engaging portions is arranged at intervals in an actuation direction of the driver blade. The power mechanism has a rotating portion and a plurality of second engaging portions. The rotating portion is rotated by a rotational force of the electric motor. The plurality of second engaging portions is provided at intervals in a rotation direction of the rotating portion. Nails are supplied from the magazine to the ejection unit.

In the driving tool described in Patent Document 1, the electric motor rotates when an operation force is applied to the trigger in the state where the striking unit is stopped at the second position. Then, the plurality of second engaging portions provided on the rotating portion independently engages with and separates from the plurality of first engaging portions provided on the driver blade, and the striking unit is actuated in a second direction. When the plurality of second engaging portions provided on the rotating portion is all separated from the plurality of first engaging portions provided on the driver blade, the striking unit is actuated in a first direction by the gas pressure of the pressure accumulation chamber, so that the driver blade strikes a nail in the ejection unit.

RELATED ART DOCUMENTS

Patent Documents

Patent Document 1: International Patent Application Publication No. 2016-199670

SUMMARY OF THE INVENTION

Problem to be Solved by the Invention

The inventors of this application have recognized the problem that the second engaging portion may engage with the first engaging portion different from the first engaging portion that is the original engagement target.

An object of the present invention is to provide a driving tool capable of making the second engaging portion engage with the first engaging portion that is the original engagement target.

Means for Solving the Problems

A driving tool according to an embodiment includes: a striking unit capable of being actuated and reciprocated between a first position and a second position, and configured to strike a fastener by being actuated from the first position to the second position in a first direction; a rotating portion configured to rotate so as to actuate the striking unit from the second position to the first position in a second direction; a plurality of first engaging portions provided at intervals on the striking unit; and a plurality of second engaging portions provided at intervals on the rotating portion and configured to singularly engage with and separate from the plurality of first engaging portions, respectively, so as to actuate the striking unit in the second direction, wherein the plurality of first engaging portions includes a specific first engaging portion and a normal first engaging portion, and wherein the plurality of second engaging portions includes a specific second engaging portion which is not associated with the normal first engaging portion and can engage with the specific first engaging portion and a normal second engaging portion which is associated with and can engage with the normal first engaging portion.

Effects of the Invention

In the driving tool according to an embodiment, the second engaging portion can engage with the first engaging portion that is the original engagement target.

DETAILED DESCRIPTION OF PREFERRED EMBODIMENTS

A typical embodiment of some embodiments included in the driving tool according to the present invention will be described with reference to drawings.

Figure 1:
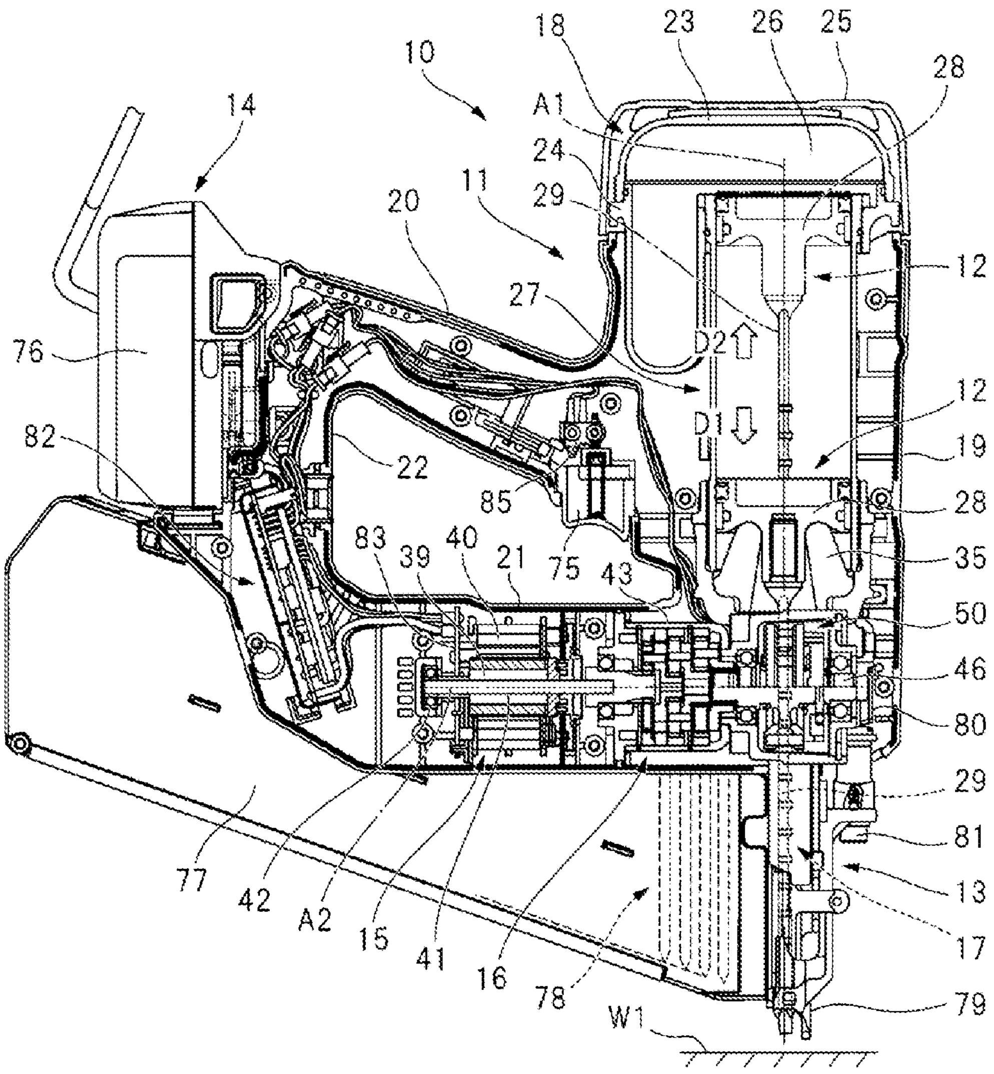
FIG. 1 is a side cross-sectional view showing an overall driving tool according to an embodiment of the present invention.
Figure 2:
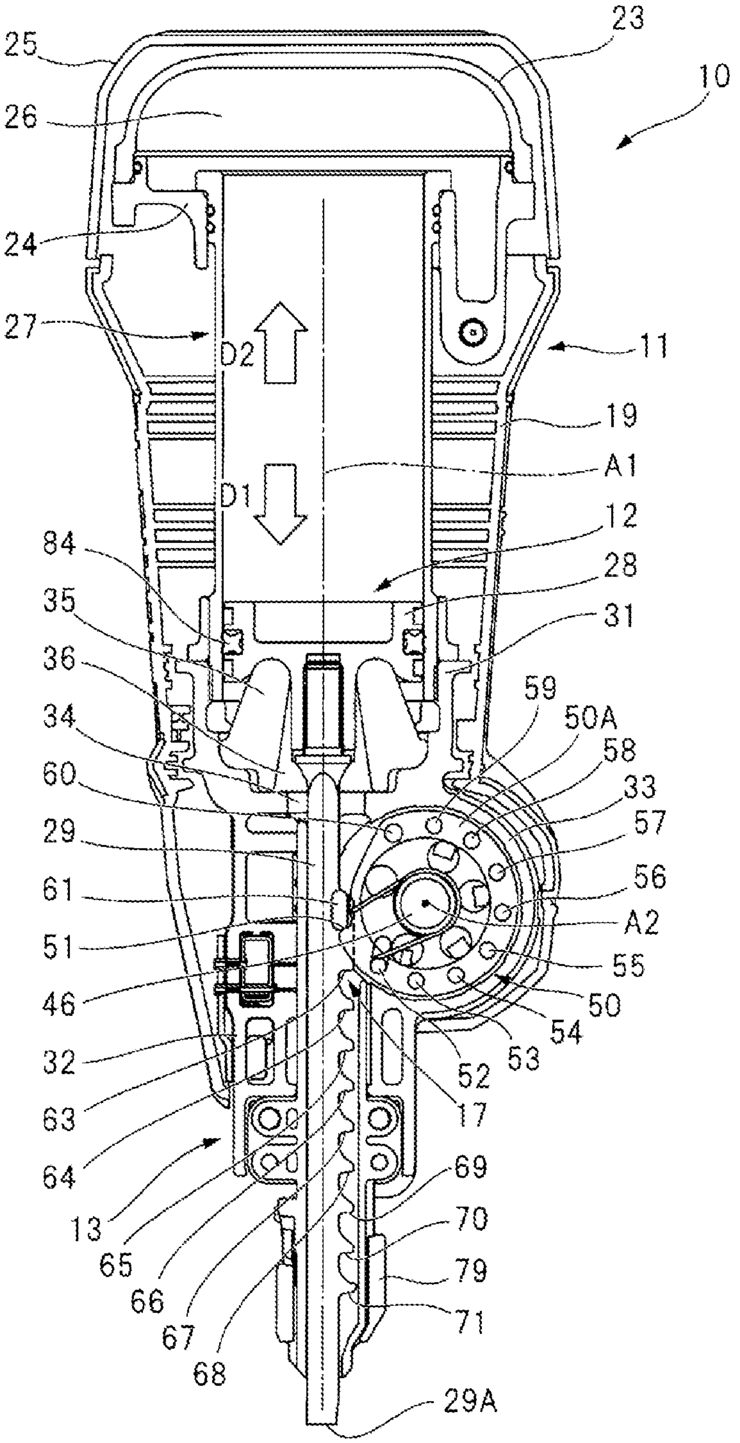
FIG. 2 is a back cross-sectional view of the driving tool.

A driving tool 10 shown in FIG. 1 and FIG. 2 includes a housing 11, a striking unit 12, a nose unit 13, a power source unit 14, an electric motor 15, a deceleration mechanism 16, an adjustment mechanism 17, and a pressure accumulation container 18. The housing 11 is an outer shell element of the driving tool 10, and the housing 11 includes a cylinder case 19, a handle 20, a motor case 21, and a mounting unit 22. The cylinder case 19 has a tubular shape, and the handle 20 and the motor case 21 are connected to the cylinder case 19. The mounting unit 22 is connected to the handle 20 and the motor case 21.

The power source unit 14 is detachably attached to the mounting unit 22. The electric motor 15 is arranged in the motor case 21. The pressure accumulation container 18 includes a cap 23 and a holder 24 to which the cap 23 is attached. A head cover 25 is attached to the cylinder case 19, and the pressure accumulation container 18 is arranged across the inside of the cylinder case 19 and the inside of the head cover 25.

A cylinder 27 is housed in the cylinder case 19. The cylinder 27 is made of metal, for example, aluminum or iron. The cylinder 27 is positioned with respect to the cylinder case 19 in the direction along a center line A1 and the radial direction. The center line A1 passes through the center of the cylinder 27. The radial direction is a radial direction of a virtual circle centered on the center line A1. A pressure chamber 26 is formed across the inside of the pressure accumulation container 18 and the inside of the cylinder 27. The pressure chamber 26 is filled with compressible gas. As the compressible gas, inert gas can be used in addition to air. Examples of the inert gas include nitrogen gas and rare gas. In this embodiment, an example in which the pressure chamber 26 is filled with air will be described.

The striking unit 12 is arranged across the inside to the outside of the housing 11. The striking unit 12 includes a piston 28 and a driver blade 29. The piston 28 can be actuated in the cylinder 27 in the direction along the center line A1. An annular sealing member 84 is attached to an outer peripheral surface of the piston 28. The sealing member 84 is in contact with an inner peripheral surface of the cylinder 27 to form a sealing surface. The driver blade 29 is made of metal, non-ferrous metal, or steel as an example. The piston 28 and the driver blade 29 are provided as separate members, and the piston 28 and the driver blade 29 are coupled to each other.

The nose unit 13 is arranged across the inside and outside of the cylinder case 19. The nose unit 13 includes a bumper support portion 31, an ejection unit 32, and a tubular portion 33. The bumper support portion 31 has a tubular shape and has a guide hole 34. The guide hole 34 is arranged to be centered on the center line A1.

A bumper 35 is arranged in the bumper support portion 31. The bumper 35 may be made of synthetic rubber or silicone rubber. The bumper 35 has a guide hole 36. The center line A1 passes through the guide hole 36. The driver blade 29 is arranged in the guide holes 34 and 36. The striking unit 12 can be actuated in a first direction D1 and a second direction D2 along the center line A1. The first direction D1 and the second direction D2 are opposite directions to each other. The first direction D1 is a direction in which the piston 28 approaches the bumper 35. The second direction D2 is the direction in which the piston 28 is separated from the bumper 35. The striking unit 12 is constantly biased in the first direction D1 by the gas pressure of the pressure chamber 26 shown in FIG. 1. The actuation of the striking unit 12 in the first direction D1 can be defined as downward movement. The actuation of the striking unit 12 in the second direction D2 can be defined as upward movement.

The ejection unit 32 is connected to the bumper support portion 31 and protrudes from the bumper support portion 31 in the direction along the center line A1. The ejection unit 32 includes an ejection path 37 and the ejection path 37 is provided along the center line A1. The driver blade 29 can be actuated in the ejection path 37 in the directions along the center line A1.

As shown in FIG. 1, the electric motor 15 is arranged in the motor case 21. The electric motor 15 includes a rotor 39 and a stator 40. The stator 40 is attached to the motor case 21. The rotor 39 is attached to a rotor shaft 41 and a first end portion of the rotor shaft 41 is rotatably supported by the motor case 21 via a bearing 42. The electric motor 15 is a brushless motor, and the rotor 39 rotates around a center line A2 when a voltage is applied to the electric motor 15.

A gear case 43 is provided in the motor case 21. The gear case 43 has a tubular shape. The deceleration mechanism 16 is provided in the gear case 43. The deceleration mechanism 16 includes plural sets of planetary gear mechanisms. An input element of the deceleration mechanism 16 is coupled to the rotor shaft 41 via a power transmission shaft 44. The power transmission shaft 44 is rotatably supported by a bearing 45.

A rotating shaft 46 is provided in the tubular portion 33. The rotating shaft 46 is rotatably supported by bearings 48 and 49. The rotor shaft 41, the power transmission shaft 44, the deceleration mechanism 16, and the rotating shaft 46 are arranged concentrically around the center line A2. An output element 97 of the deceleration mechanism 16 and the rotating shaft 46 are arranged concentrically, and the output element 97 and the rotating shaft 46 are rotated integrally. The deceleration mechanism 16 is arranged on a power transmission path extending from the electric motor 15 to the rotating shaft 46. The adjustment mechanism 17 converts the rotational force of the rotating shaft 46 into the force that biases the striking unit 12 in the second direction D2.

(First Example of Adjustment Mechanism)

Figure 3:
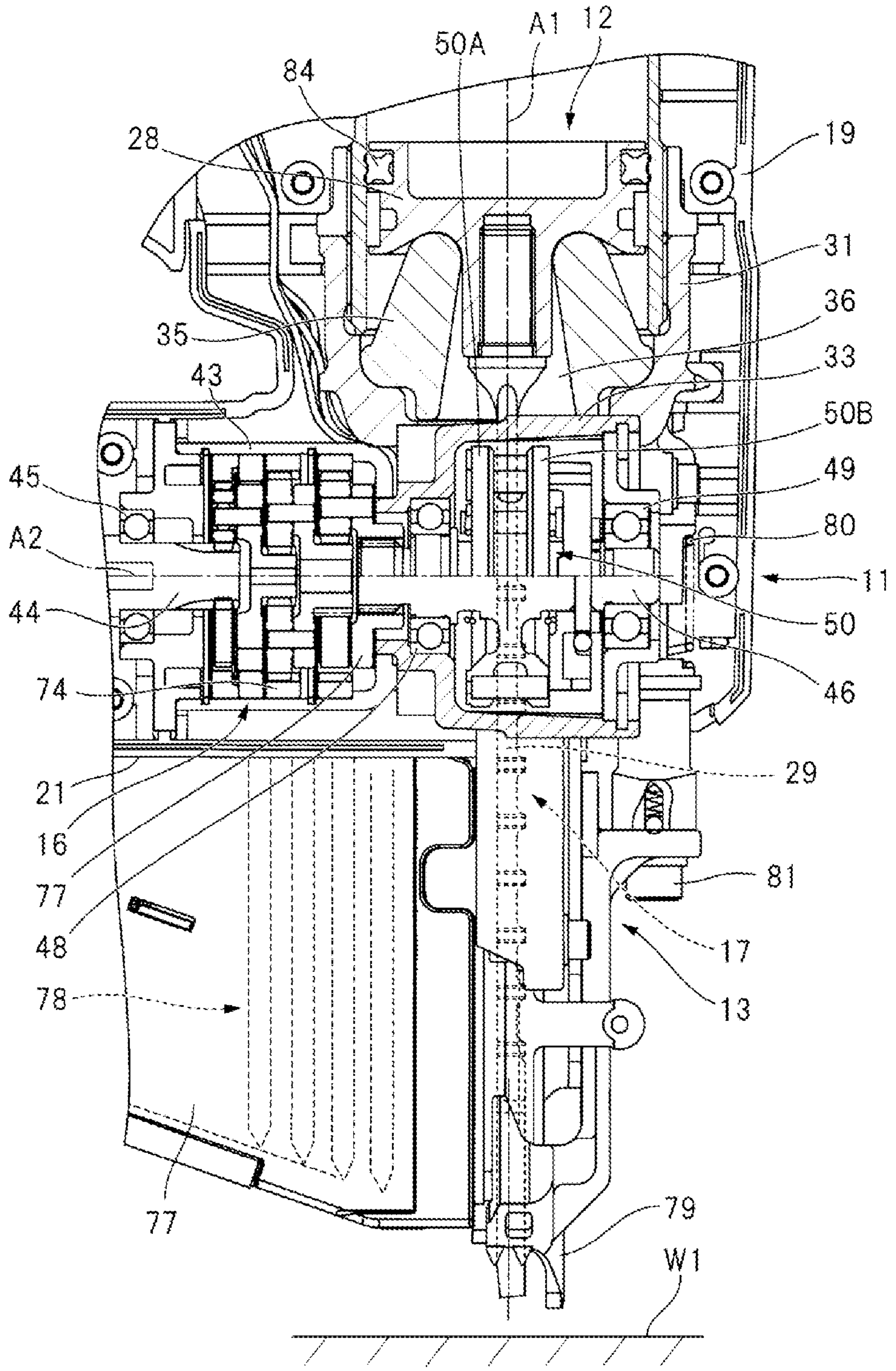
FIG. 3 is an enlarged cross-sectional view showing the first example of an adjustment mechanism provided in the driving tool.
Figure 4:
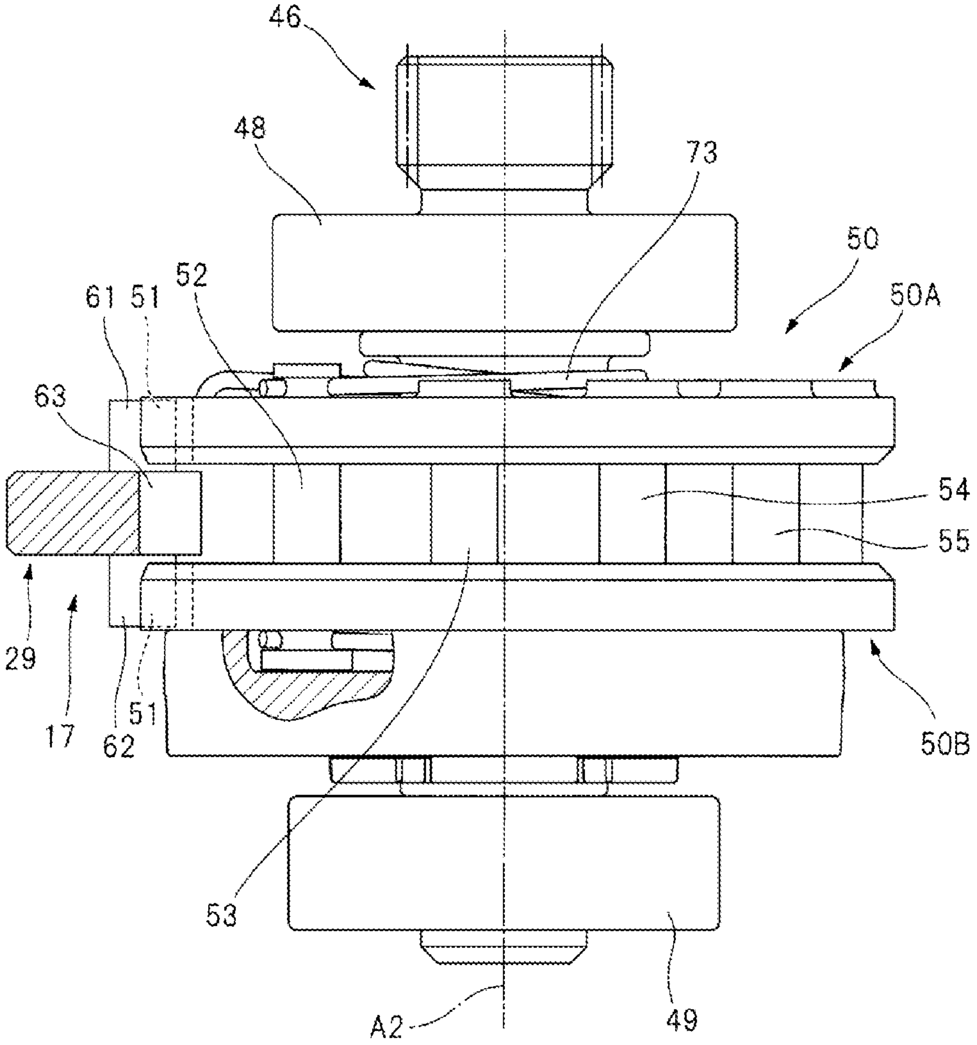
FIG. 4 is a bottom cross-sectional view of the adjustment mechanism shown in FIG. 3.
Figure 5:
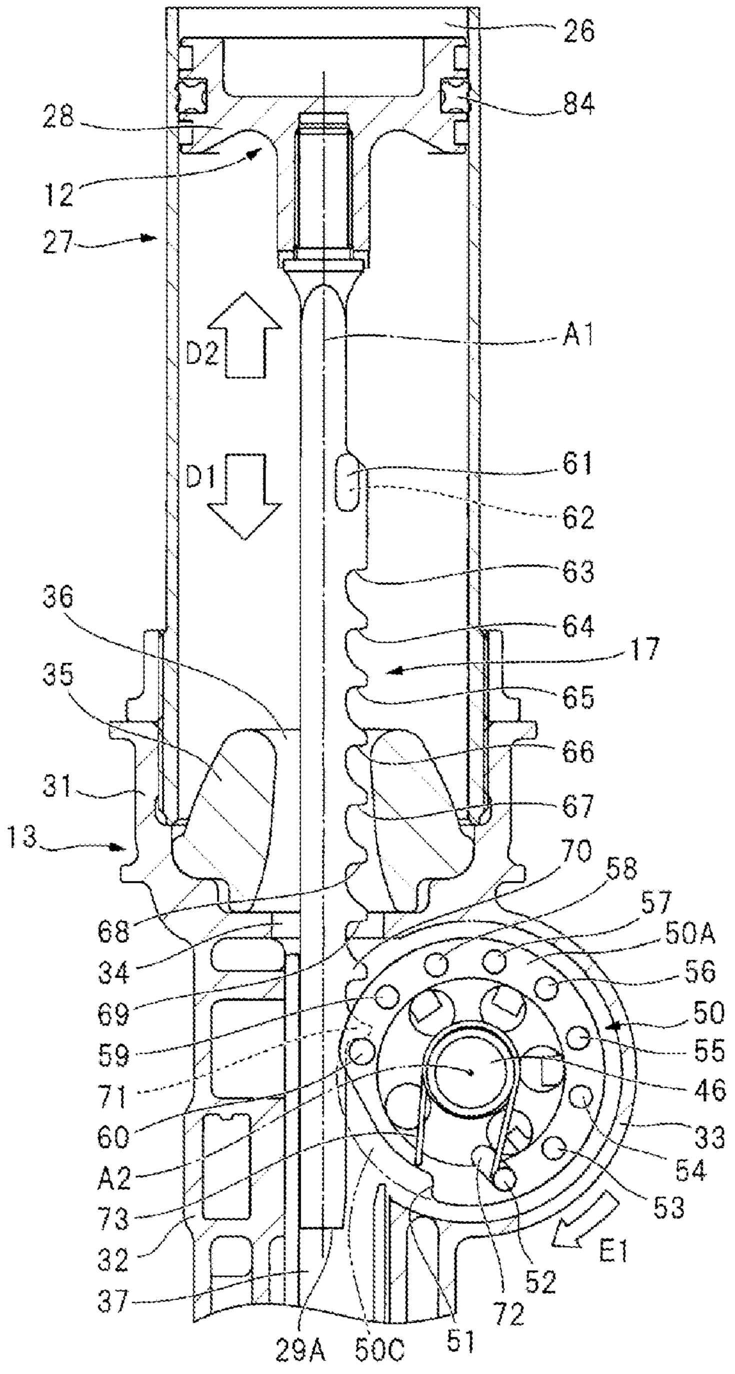
FIG. 5 is a back cross-sectional view showing the state in which the striking unit provided in the driving tool is stopped at a stand-by position.

As shown in FIG. 3, FIG. 4, and FIG. 5, the adjustment mechanism 17 includes the driver blade 29, a plurality of first engaging portions provided on the driver blade 29, a wheel 50, and a plurality of second engaging portions provided on the wheel 50. In a plane perpendicular to the center line A1, the cross-sectional shape of the driver blade 29 is substantially quadrangular. The plurality of first engaging portions 61, 62, 63, 64, 65, 66, 67, 68, 69, 70, and 71 is provided on the driver blade 29. The plurality of first engaging portions 63, 64, 65, 66, 67, 68, 69, 70, and 71 is provided integrally with the driver blade 29. The plurality of first engaging portions 61 and 62 may be provided integrally with the driver blade 29, or may be provided separately from the driver blade 29 and fixed to the driver blade 29.

The plurality of first engaging portions 61, 62, 63, 64, 65, 66, 67, 68, 69, 70, and 71 is arranged between a tip 29 of the driver blade 29 in the direction along the center line A1 and the piston 28. When the striking unit 12 is actuated in the second direction D2, the plurality of first engaging portions 61 and 62 of the plurality of first engaging portions is located at the head, that is, at the first position in the second direction D2. When the striking unit 12 is actuated in the second direction D2, the plurality of first engaging portions 63, 64, 65, 66, 67, 68, 69, 70, and 71 is located behind the plurality of first engaging portions 61 and 62.

The first engaging portions 61 and 62 are provided at the same positions in the direction along the center line A1. The first engaging portions 61 and 62 protrude from the driver blade 29 in opposite directions to each other in the direction along the center line A2. The plurality of first engaging portions 61, 62, 63, 64, 65, 66, 67, 68, 69, 70, and 71 is arranged in this order in the direction along the center line A1. The first engaging portions 61 and 62 are arranged between the first engaging portion 63 and the piston 28. The first engaging portion 71 is arranged between the first engaging portion 70 and the tip 29A. The plurality of first engaging portions 63, 64, 65, 66, 67, 68, 69, 70, and 71 is formed by providing protrusions at predetermined intervals on the edge of the driver blade 29.

The wheel 50 is attached to the rotating shaft 46. The wheel 50 is made of metal, non-ferrous metal, or steel as an example. The wheel 50 rotates around the center line A2. The center line A2 is the direction intersecting the actuation direction of the striking unit 12, and is arranged apart from the driver blade 29.

The wheel 50 has a first disc portion 50A and a second disc portion 50B. The first disc portion 50A and the second disc portion 50B are arranged at different positions in the direction along the center line A2. Namely, the first disc portion 50A and the second disc portion 50B are arranged at an interval in the direction along the center line A2. The distance between the first disc portion 50A and the second disc portion 50B in the direction along the center line A2 is larger than the thickness of the driver blade 29 in the direction along the center line A2. When the striking unit 12 is actuated along the center line A1, part of the driver blade 29 and the plurality of first engaging portions 63, 64, 65, 66, 67, 68, 69, 70, and 71 pass between the first disc portion 50A and the second disc portion 50B.

Part of the outer peripheral surface of the first disc portion 50A and the second disc portion 50B has an arc shape to be centered on the center line A2. In each of the first disc portion 50A and the second disc portion 50B, a notch portion 50C is formed in a second region having a predetermined angle in a rotation direction E1 of the wheel 50. The notch portion 50C is formed in a region of 90 degrees as an example. The minimum outer diameter of the notch portion 50C centered on the center line A2 is smaller than the maximum outer diameter of a first region in which the notch portion 50C is not formed. The first region is a region of approximately 270 degrees in the rotation direction E1 of the wheel 50. The first disc portion 50A and the second disc portion 50B each have a second engaging portion 51 facing the notch portion 50C.

As an example of the plurality of second engaging portions, ten second engaging portions 52, 53, 54, 55, 56, 57, 58, 59, and 60 are provided on the wheel 50. The second engaging portions 52, 53, 54, 55, 56, 57, 58, 59, and 60 are provided separately from the first disc portion 50A and the second disc portion 50B. The second engaging portions 52, 53, 54, 55, 56, 57, 58, 59, and 60 are fixed to the first disc portion 50A and the second disc portion 50B. The second engaging portions 51, 52, 53, 54, 55, 56, 57, 58, 59, and 60 are arranged on the same circumference centered on the center line A2. The outer diameter of a first circumscribed circle of the second engaging portion 51 is larger than the outer diameter of a second circumscribed circle of the second engaging portions 52, 53, 54, 55, 56, 57, 58, 59, and 60. The first circumscribed circle and the second circumscribed circle are centered on the center line A2. As shown in FIG. 4, the second engaging portion 51 and the first engaging portions 61 and 62 are located at positions overlapping in the direction along the center line A2, and have a mutually associated relationship. Also, the second engaging portion 51 and the first engaging portions 63, 64, 65, 66, 67, 68, 69, 70, and 71 are located at different positions in the direction along the center line A2, and do not have the mutually associated relationship. Further, the second engaging portions 52, 53, 54, 55, 56, 57, 58, 59, and 60 and the first engaging portions 63, 64, 65, 66, 67, 68, 69, 70, and 71 are located at positions overlapping in the direction along the center line A2, and have a mutually associated relationship. Also, the second engaging portions 52, 53, 54, 55, 56, 57, 58, 59, and 60 and the first engaging portions 61 and 62 are located at different positions in the direction along the center line A2, and do not have the mutually associated relationship.

The wheel 50 rotates clockwise in FIG. 5 by the rotational force of the electric motor 15. The second engaging portions 52, 53, 54, 55, 56, 57, 58, 59, and 60 are arranged at equal intervals in the first region in the rotation direction E1 of the wheel 50. The second engaging portions 52, 53, 54, 55, 56, 57, 58, 59, and 60 are arranged in this order along the rotation direction E1 of the wheel 50. The second engaging portion 51 is located at the head, that is, at the first position in the rotation direction E1 while the wheel 50 makes one rotation. A single second engaging portion 51 is provided in the rotation direction E1 of the wheel 50.

In the rotation direction E1 of the wheel 50, the second engaging portions 52, 53, 54, 55, 56, 57, 58, 59, and 60 are located behind the second engaging portion 51. Therefore, when the wheel 50 rotates in the state where the striking unit 12 is stopped, the second engaging portion 51 of the plurality of second engaging portions first approaches the actuation region of the driver blade 29 in the rotation direction E1 of the wheel 50. When the second engaging portion 51 engages with the corresponding first engaging portions 61 and 62 by the rotation of the wheel 50, the positional relationship between the driver blade 29 and the wheel 50 is appropriately adjusted. Therefore, the position of the second engaging portion 51 is not limited to the first position in the rotation direction E1 of the wheel 50, and the position in the plurality of second engaging portions is not specified.

The second engaging portion 52 is arranged next to the second engaging portion 51 in the rotation direction E1 of the wheel 50. The second engaging portions 52, 53, 54, 55, 56, 57, 58, 59, and 60 are pins or columns, respectively. The second engaging portions 52, 53, 54, 55, 56, 57, 58, 59, and 60 are provided between the first disc portion 50A and the second disc portion 50B in the direction along the center line A2. The second engaging portions 53, 54, 55, 56, 57, 58, 59, and 60 are fixed to the first disc portion 50A and the second disc portion 50B.

A guide portion 72 is provided on each of the first disc portion 50A and the second disc portion 50B. The guide portion 72 is a hole or a groove, and the second engaging portion 52 is movable along the guide portion 72. Namely, the position of the second engaging portion 52 in the radial direction of the first disc portion 50A and the second disc portion 50B can be changed. When the position of the second engaging portion 52 in the rotation direction of the wheel 50 is changed, the position of the second engaging portion 52 in the rotation direction of the wheel 50 may be changed or may not be changed.

A biasing member 73 is attached to the rotating shaft 46 or the wheel 50. The biasing member 73 is, for example, a metal spring. The biasing member 73 biases the second engaging portion 52 outward in the radial direction of the wheel 50. In the state where the second engaging portion 52 biased by the biasing member 73 is stopped, the second engaging portion 52 is located on the same circumference with the other second engaging portion 53, 54, 56, 57, 58, 59, and 60.

As shown in FIG. 3, a rotation preventive mechanism 74 is provided in the gear case 43. The rotation preventive mechanism 74 enables the rotating shaft 46 to rotate clockwise in the drawing by the rotational force generated when the electric motor rotates forward. The rotation preventive mechanism 74 prevents the counterclockwise rotation of the rotating shaft 46 in FIG. 5 when the actuation force of the striking unit 12 in the first direction D1 is transmitted to the wheel 50.

As shown in FIG. 1, a trigger 75 and a trigger sensor 85 are provided in the handle 20. The trigger sensor 85 detects the presence or absence of an operation force applied to the trigger 75, and outputs a signal in accordance with the detection result.

The power source unit 14 includes a storage case 76 and a plurality of battery cells stored in the storage case 76. The battery cell is a secondary battery that can be charged and discharged, and a known battery cell such as a lithium ion battery, a nickel hydrogen battery, a lithium ion polymer battery, or a nickel cadmium battery can be used as the battery cell as appropriate.

Also, a magazine 77 is provided as shown in FIG. 1, and the magazine 77 is supported by the ejection unit 32 and the mounting unit 22. The magazine 77 stores nails 78. The magazine 77 includes a feeder, and the feeder feeds the nails 78 in the magazine 77 to the ejection path 37. The ejection unit 32 is made of metal or synthetic resin. A push lever 79 is attached to the ejection unit 32. The push lever 79 can be actuated with respect to the ejection unit 32 within a predetermined range in the direction along the center line A1. An elastic member 80 for biasing the push lever 79 in the direction along the center line A1 is provided. The elastic member 80 is, for example, a metal spring, and the elastic member 80 biases the push lever 79 in the direction away from the bumper support portion 31. The push lever 79 is stopped by coming into contact with a stopper 81.

A control unit 82 is provided in the mounting unit 22. The control unit 82 includes a microprocessor. The microprocessor includes an input/output interface, a control circuit, an arithmetic processing unit, and a memory unit. Also, a motor substrate 83 is provided in the motor case 21. An inverter circuit is provided on the motor substrate 83. The inverter circuit connects and disconnects the stator 40 of the electric motor 15 and the power source unit 14. The inverter circuit includes a plurality of switching elements, and the plurality of switching elements can be independently turned on and off. The control unit 82 controls the inverter circuit, thereby controlling the rotation and stop of the electric motor 15, the number of rotations of the electric motor 15, and the rotation direction of the electric motor 15.

Also, a push sensor and a position detection sensor are provided in the housing 11. The push sensor detects whether the push lever 79 is pressed to a workpiece W1, and outputs a signal based on the detection. The position detection sensor detects the position of the wheel 50 in the rotation direction E1, and outputs a signal based on the detection. The control unit 82 detects the position of the striking unit 12 in the direction of the center line A1 by processing the signal of the position detection sensor. Further, a velocity sensor that detects the rotation speed of the rotor 39 of the electric motor 15 and a phase sensor that detect the phase of the rotor 39 in the rotation direction are provided.

Signals output from the trigger sensor 85, the push sensor, the position detection sensor, and the phase sensor are input to the control unit 82. The control unit 82 controls the inverter circuit by processing the input signals. In this manner, the control unit 82 controls the stop, the rotation, the rotation direction, and the rotation speed of the electric motor 15.

Next, an example of using the driving tool 10 will be described. When the control unit 82 detects at least one of the fact that the operation force is not applied to the trigger 75 and the fact that the push lever 79 is not pressed to the workpiece W1, it stops the power supply to the electric motor 15. Thus, the electric motor 15 is stopped and the striking unit 12 is stopped at a stand-by position.

Here, the example in which the stand-by position of the striking unit 12 is the state where the piston 28 is separated from the bumper 35 as shown in FIG. 5 will be described. The second engaging portion 60 engages with the first engaging portion 71. The second engaging portions 51, 52, 53, 54, 55, 56, 57, 58, and 59 are separated from the corresponding first engaging portions 61, 62, 63, 64, 65, 66, 67, 68, 69, and 70, respectively. The gas pressure of the pressure chamber 26 is constantly applied to the striking unit 12, and the striking unit 12 is biased in the first direction D1. The biasing force in the first direction D1 applied to the striking unit 12 is transmitted from the first engaging portion 71 to the second engaging portion 60. The wheel 50 is biased counterclockwise in FIG. 5, but the rotation preventive mechanism 74 prevents the rotation of the wheel 50. By such a principle, the striking unit 12 is stopped at the stand-by position.

When the control unit 82 detects that the operation force is applied to the trigger 75 and that the push lever 79 is pressed to the workpiece W1, it causes the power source unit 14 to apply a voltage to the electric motor 15, thereby rotating the electric motor 15 forward. The rotational force of the electric motor 15 is transmitted to the rotating shaft 46 via the deceleration mechanism 16. Then, the rotating shaft 46 and the wheel 50 are rotated clockwise in FIG. 5, and the striking unit 12 moves upward. When the striking unit 12 moves upward, the gas pressure of the pressure chamber 26 increases. The deceleration mechanism 16 makes the rotation speed of the wheel 50 slower than the rotation speed of the electric motor 15.

When the second engaging portion 60 is separated from the first engaging portion 71, the striking unit 12 moves downward by the gas pressure of the pressure chamber 26. The position of the striking unit 12 at the time when the second engaging portion 60 is separated from the first engaging portion 71 is the top dead center. In the process in which the striking unit 12 moves downward from the top dead center, all the second engaging portions are located outside the actuation range in which the first engaging portions are actuated in the direction along the center line A1. The driver blade 29 strikes one nail 78 located in the ejection path 37, and the nail 78 is driven into the workpiece W1.

The piston 28 collides with the bumper 35 after the nail 78 is driven into the workpiece W1. The bumper 35 is elastically deformed by receiving a load in the direction of the center line A1, and the bumper 35 absorbs part of the kinetic energy of the striking unit 12. The state in which the piston 28 is in contact with the bumper 35 is the bottom dead center of the striking unit 12. The striking unit 12 can be actuated between the top dead center and the bottom dead center. The top dead center can be defined as the first position of the striking unit 12. The bottom dead center can be defined as the second position of the striking unit 12.

Figure 6:
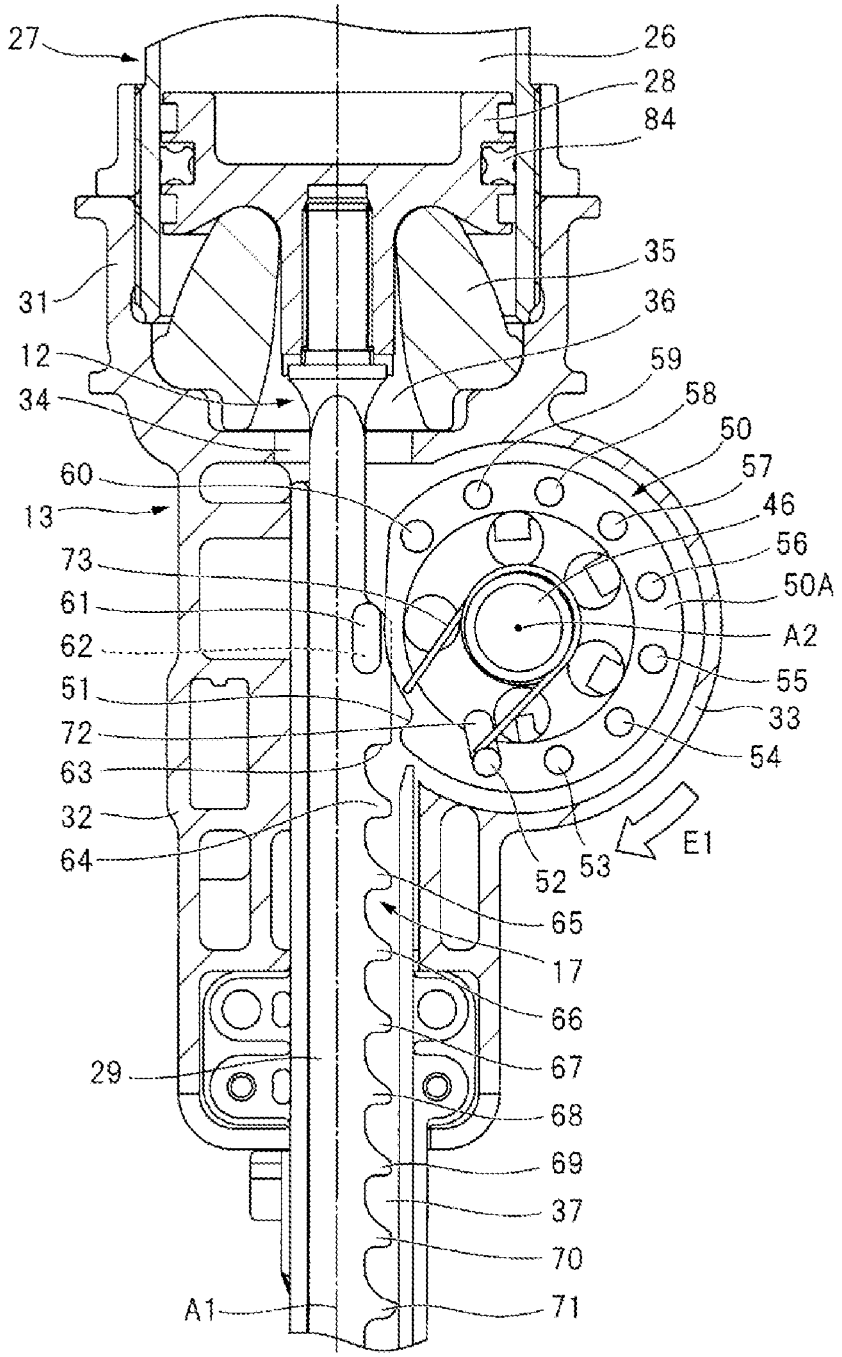
FIG. 6 is a back cross-sectional view showing the state in which the striking unit provided in the driving tool is stopped at a bottom dead center.

The control unit 82 continues the rotation of the electric motor 15 even after the striking unit 12 reaches the bottom dead center. Therefore, the wheel 50 rotates clockwise as shown in FIG. 6, and the second engaging portion 51 approaches the first engaging portions 61 and 62. As shown in FIG. 4, the driver blade 29 is located between the first disc portion 50A and the second disc portion 50B in the direction along the center line A2. Therefore, the second engaging portion 51 does not come into contact with the driver blade 29 and does not engage with any of the first engaging portions 63, 64, 65, 66, 67, 68, 69, and 71. Further, since the first disc portion 50A and the second disc portion 50B have the notch portion 50C, the first engaging portion 61 does not come into contact with the first disc portion 50A, and the first engaging portion 62 does not come into contact with the second disc portion 50B.

Figure 7:
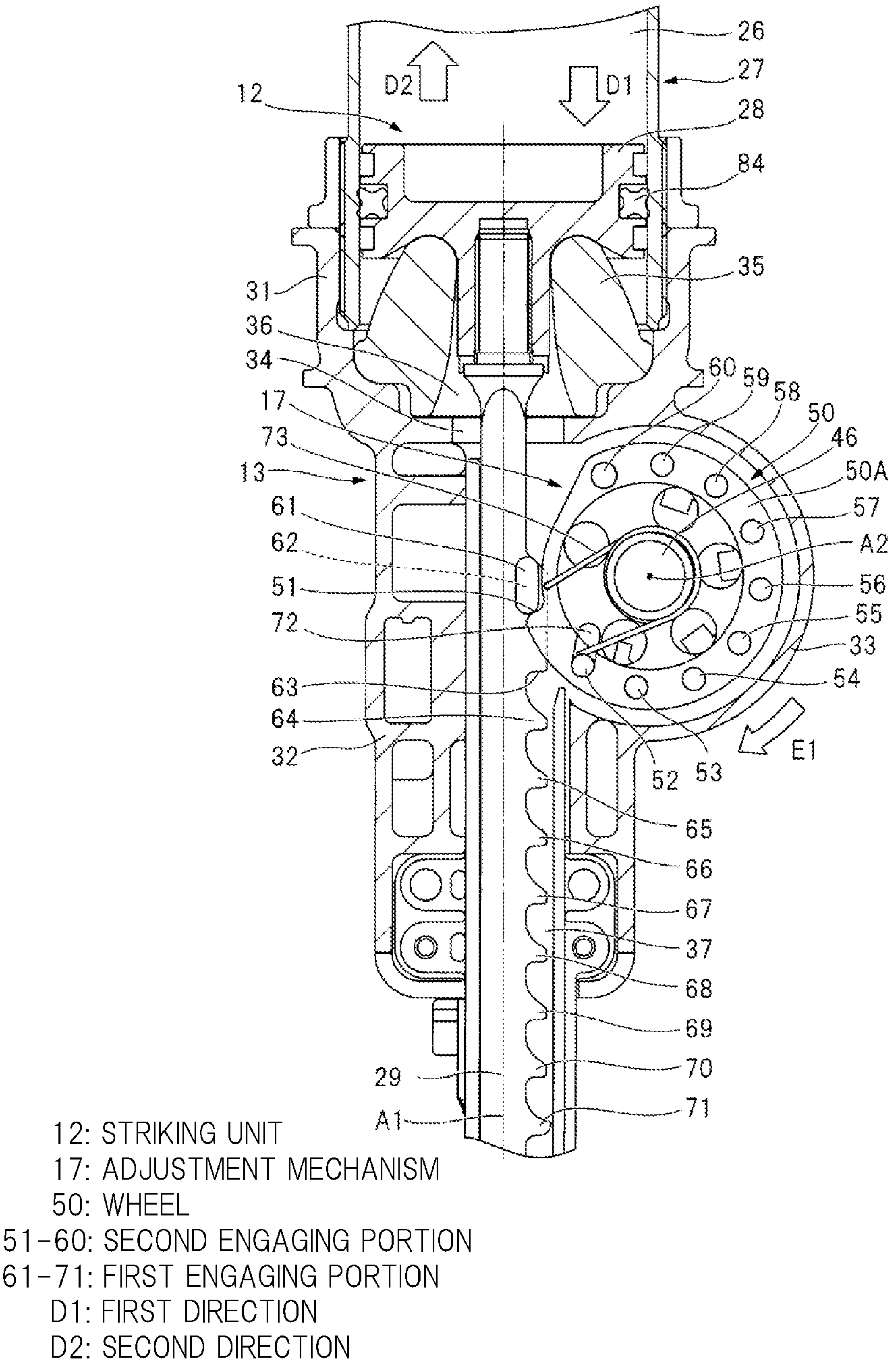
FIG. 7 is a back cross-sectional view showing the state in which the striking unit provided in the driving tool moves upward from the bottom dead center.

Then, as shown in FIG. 7, when the second engaging portion engages with the first engaging portions 61 and 62, respectively, the striking unit 12 is actuated from the bottom dead center to the top dead center by the rotational force of the wheel 50. Also, the second engaging portion 52 engages with and separates from the first engaging portion 63, and the second engaging portion 53 engages with and separates from the first engaging portion 64. Further, the second engaging portion 54 engages with and separates from the first engaging portion 65, and the second engaging portion 55 engages with and separates from the first engaging portion 66. Further, the second engaging portion 56 engages with and separates from the first engaging portion 67, and the second engaging portion 57 engages with and separates from the first engaging portion 68. Further, the second engaging portion 58 engages with and separates from the first engaging portion 69, and the second engaging portion 59 engages with and separates from the first engaging portion 70. Then, when the second engaging portion 60 engages with the first engaging portion 71 and the control unit 82 detects that the striking unit 12 has reached the stand-by position as shown in FIG. 5, the control unit 82 stops the electric motor 15.

Figure 8:
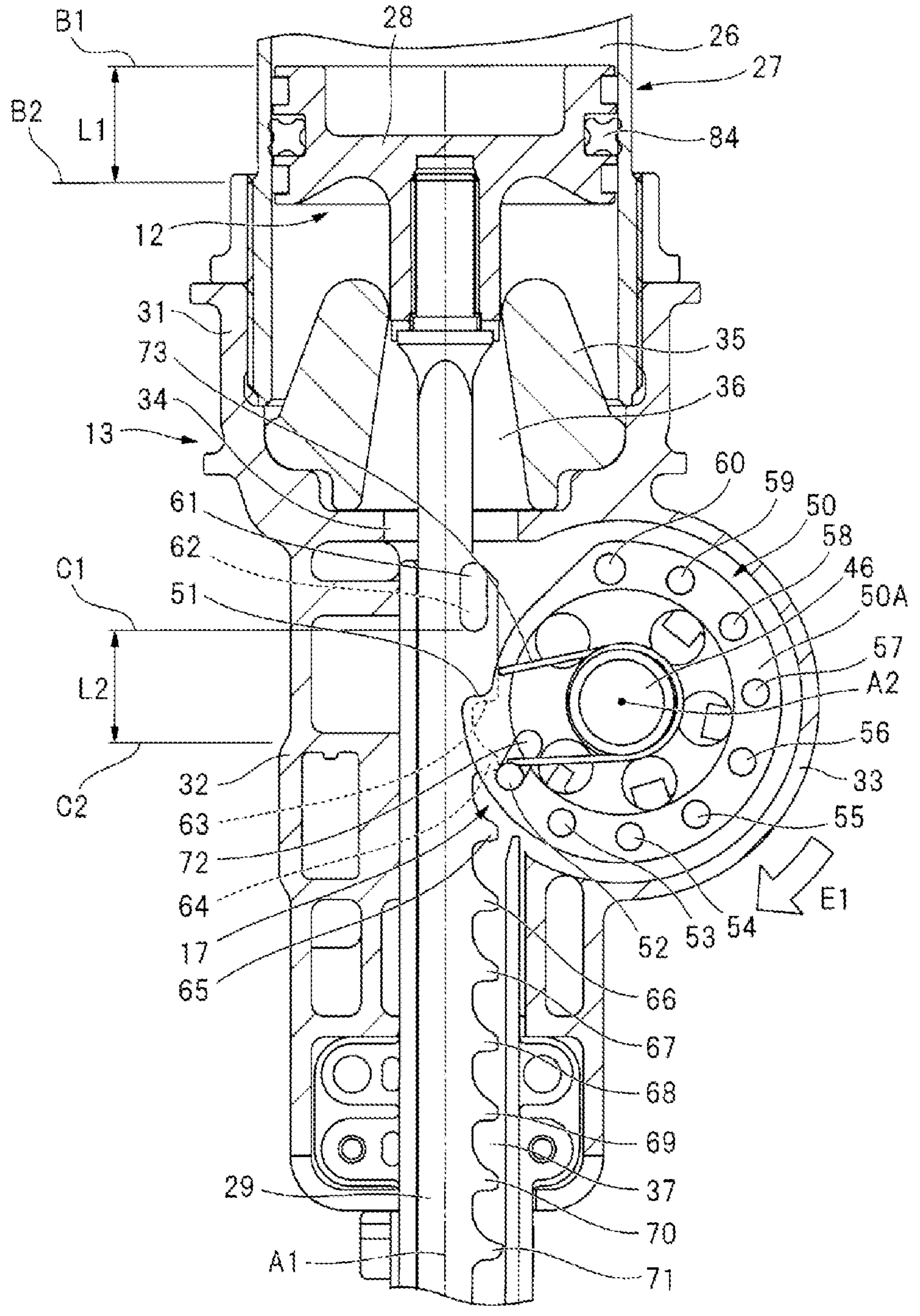
FIG. 8 is a back cross-sectional view showing the state in which the striking unit provided in the driving tool is stopped at an intermediate position.

FIG. 8 shows the state in which the striking unit 12 is stopped at an intermediate position between the top dead center and the bottom dead center during downward movement. For example, when the nail 78 struck by the striking unit 12 is jammed in the ejection path 37, the striking unit 12 is stopped at an intermediate position. The position B1 of the upper end of the piston 28 and the position B2 of the upper end of the piston 28 differ by a distance L1 in the direction along the center line A1. The position B1 is an example in the case where the striking unit 12 is stopped at an intermediate position. The position B2 corresponds to the case where the striking unit 12 is stopped at the bottom dead center.

Also, the position C1 of the lower end of the first engaging portions 61 and 62 and the position C2 of the lower end of the first engaging portions 61 and 62 differ by a distance L2 in the direction along the center line A1. The position C1 is an example in the case where the striking unit 12 is stopped at an intermediate position. The position C2 corresponds to the case where the striking unit 12 is stopped at the bottom dead center. The lower end of the first engaging portions 61 and 62 is the position with which the second engaging portion 51 comes into contact. The distance L1 and the distance L2 are the same.

When the wheel 50 rotates clockwise in the state where the striking unit 12 is stopped at the bottom dead center as shown in FIG. 7, the second engaging portion 51 engages with the first engaging portions 61 and 62 at the position C2. On the other hand, when the wheel 50 rotates clockwise in the state where the striking unit 12 is stopped at the intermediate position, the second engaging portion 51 engages with the first engaging portions 61 and 62 at the position C1.

Further, as shown in FIG. 4, the driver blade 29 is located between the first disc portion 50A and the second disc portion 50B in the direction along the center line A2. Therefore, the second engaging portion 51 does not engage with the first engaging portions 63 and 64, and the second engaging portion 51 engages with the first engaging portions 61 and 62 which are the original engagement targets. The original engagement target is the first engaging portion with which the second engaging portion 51 engages when the wheel 50 rotates in the state where the striking unit 12 is stopped at the bottom dead center.

Further, the second engaging portion 52 engages with the first engaging portion 63. After that, the second engaging portions 53, 54, 55, 56, 57, 58, 59, and 60 engage with and separate from the first engaging portions that are the original engagement targets, respectively, and the striking unit 12 moves upward. In this way, it is possible to prevent the second engaging portion 51 located at the head in the rotation direction E1 of the wheel 50 from engaging with the first engaging portion located behind the first engaging portions 61 and 62 located at the head in the second direction D2 of the striking unit 12, for example, the first engaging portion 63 or the first engaging portion 64.

Then, after the striking unit 12 is stopped at the stand-by position, the user removes the nail 78 from the ejection path 37. In the process in which the user resumes the use of the driving tool 10, the striking unit 12 reaches the top dead center from the stand-by position, and the striking unit 12 moves downward, all the second engaging portions are located outside the actuation range in which the first engaging portions are actuated in the direction along the center line A1. Therefore, it is possible to prevent any of the first engaging portions, for example, the first engaging portion 71, from colliding with any of the second engaging portions, for example, the second engaging portion 60. Accordingly, it is possible to suppress the durability of at least one of the driver blade 29 and the wheel 50 from being lowered.

In addition, all the second engaging portions engage with and separate from the first engaging portions that are the original engagement targets, and the striking unit 12 reaches the top dead center. Therefore, the actuation amount of the striking unit 12 in the first direction D1 can be maintained to the maximum, and it is possible to prevent the striking force applied to the nail 78 from being insufficient.

Further, in order to move the striking unit 12 upward by the rotational force of the wheel 50 when the striking unit 12 is stopped at the intermediate position, the lower ends of the first engaging portions 61 and 62 need to be located within the movement region of the second engaging portion 51 as a premise.

Further, when the striking unit 12 is stopped at the intermediate position, the second engaging portion 52 does not engage with the first engaging portion 63 that is the original engagement target, and the second engaging portion 52 comes into contact with the tip of the first engaging portion 64 in some cases as shown in FIG. 8. In this case, when the wheel 50 rotates, the second engaging portion 52 moves along the guide portion 72. After the second engaging portion 52 gets over the first engaging portion 64, the second engaging portion 52 engages with the first engaging portion 63.

Therefore, in order to make all of the plurality of second engaging portions engage with and separate from the original first engaging portions, the striking unit 12 needs to be stopped at the position where the second engaging portion 52 can get over the first engaging portion 64 as a premise. The position farthest from the bottom dead center of the striking unit 12 among the intermediate positions of the striking unit 12 in which the second engaging portion 52 can get over the first engaging portion 64 can be defined as the first limit position of the piston 28. The maximum value of the distance L1 shown in FIG. 8 is determined in accordance with the first limit position of the piston 28.

Figure 9:
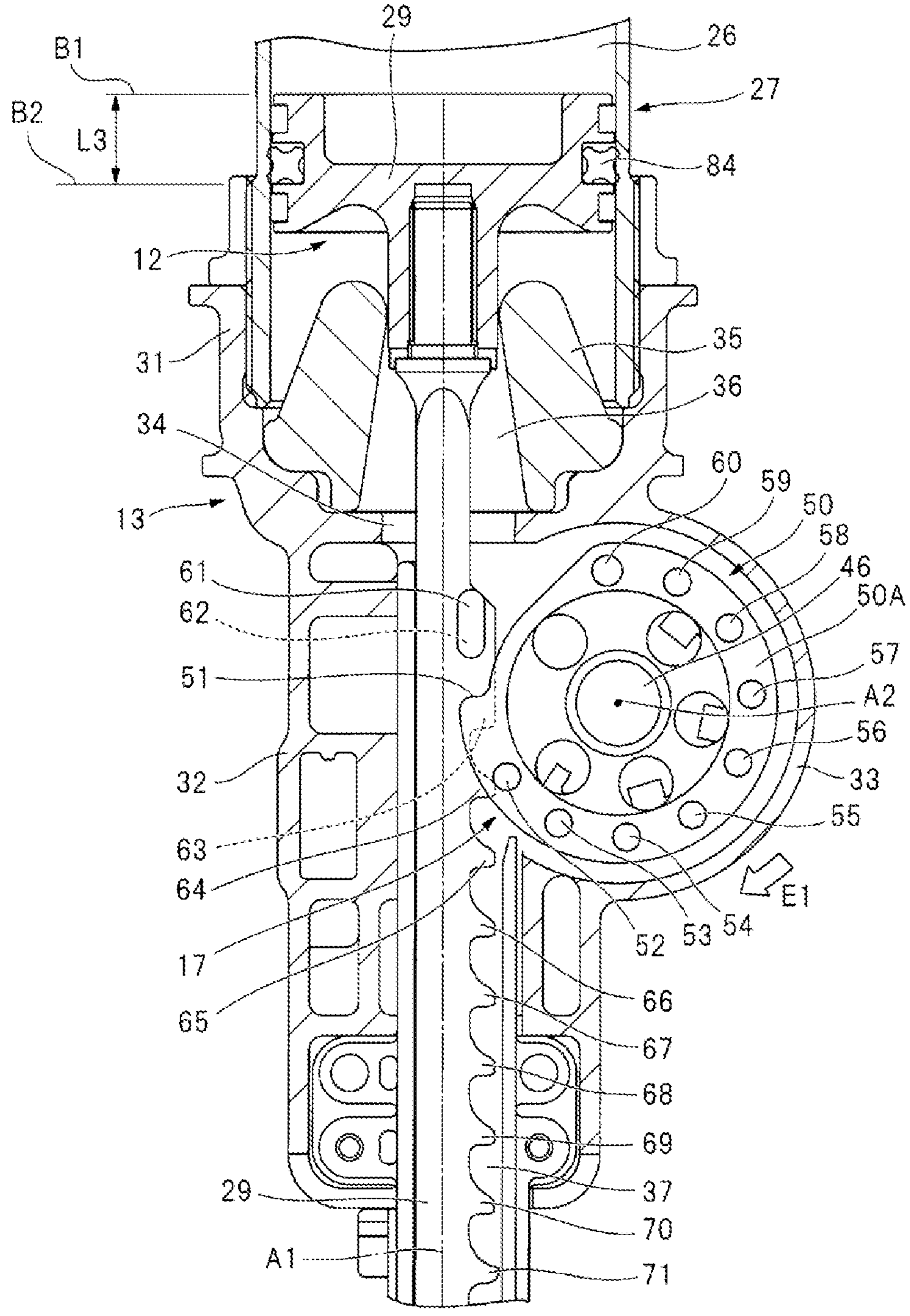
FIG. 9 is a back cross-sectional view showing a modification of the first example of the adjustment mechanism provided in the driving tool.

FIG. 9 shows an example of modification of the adjustment mechanism 17. Neither the first disc portion 50A nor the second disc portion 50B includes the guide portion 72 shown in FIG. 6. Namely, the second engaging portion 52 is fixed to the first disc portion 50A and the second disc portion 50B. Therefore, the second engaging portion 52 cannot get over the first engaging portion 64. In order to move the striking unit 12 upward by the rotational force of the wheel 50 from the intermediate position, the striking unit 12 needs to be stopped at the intermediate position where the second engaging portion 52 can engage with the first engaging portion 63 without getting over the first engaging portion 64 as a premise. The intermediate position of the striking unit 12 where the second engaging portion 52 can engage with the first engaging portion 63 without getting over the first engaging portion 64 can be defined as the second limit position of the piston 28. The maximum value of the distance L3 shown in FIG. 9 is determined in accordance with the second limit position of the piston 28. The distance L3 is shorter than the distance L1. The other structure of the adjustment mechanism 17 shown in FIG. 9 has the same structure and can obtain the same effect as the adjustment mechanism 17 shown in FIG. 6 to FIG. 8.

(Second Example of Adjustment Mechanism)

Figure 10:
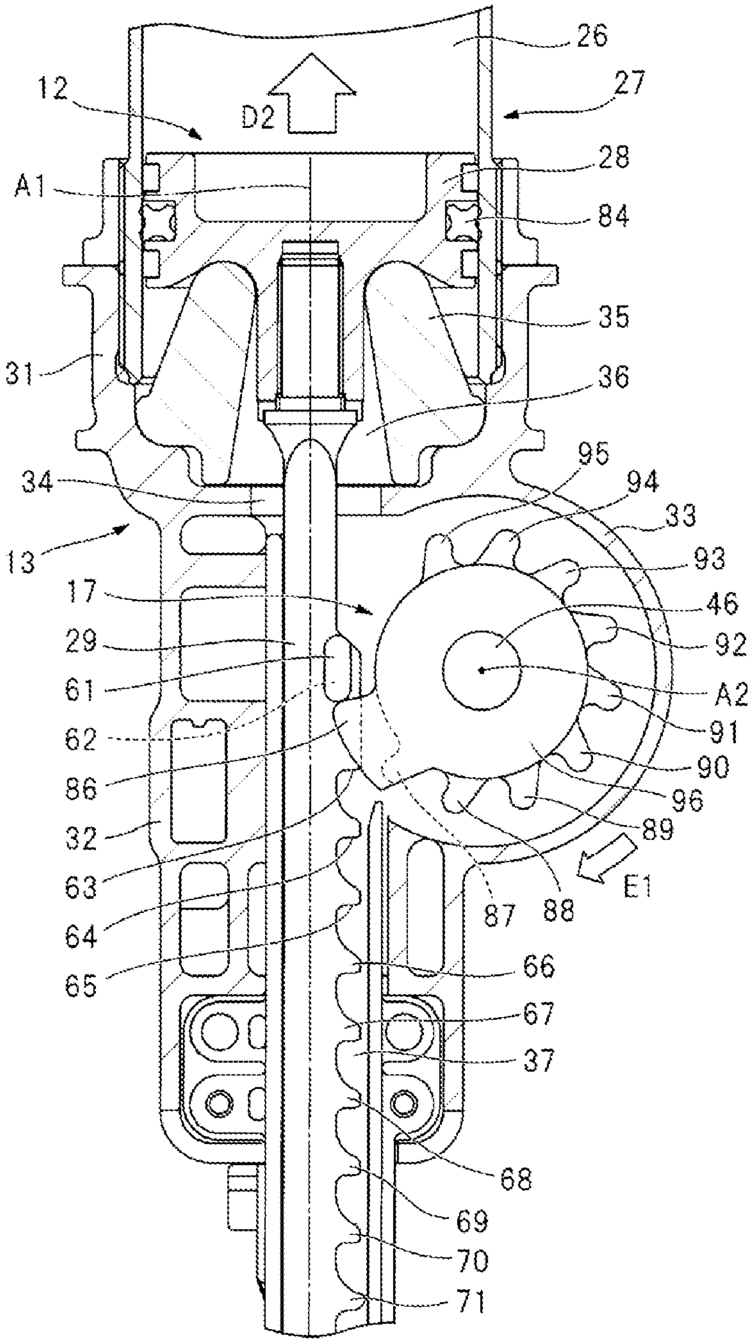
FIG. 10 is a back cross-sectional view showing the second example of the adjustment mechanism provided in the driving tool and showing the state in which the striking unit is located at the bottom dead center.
Figure 11:
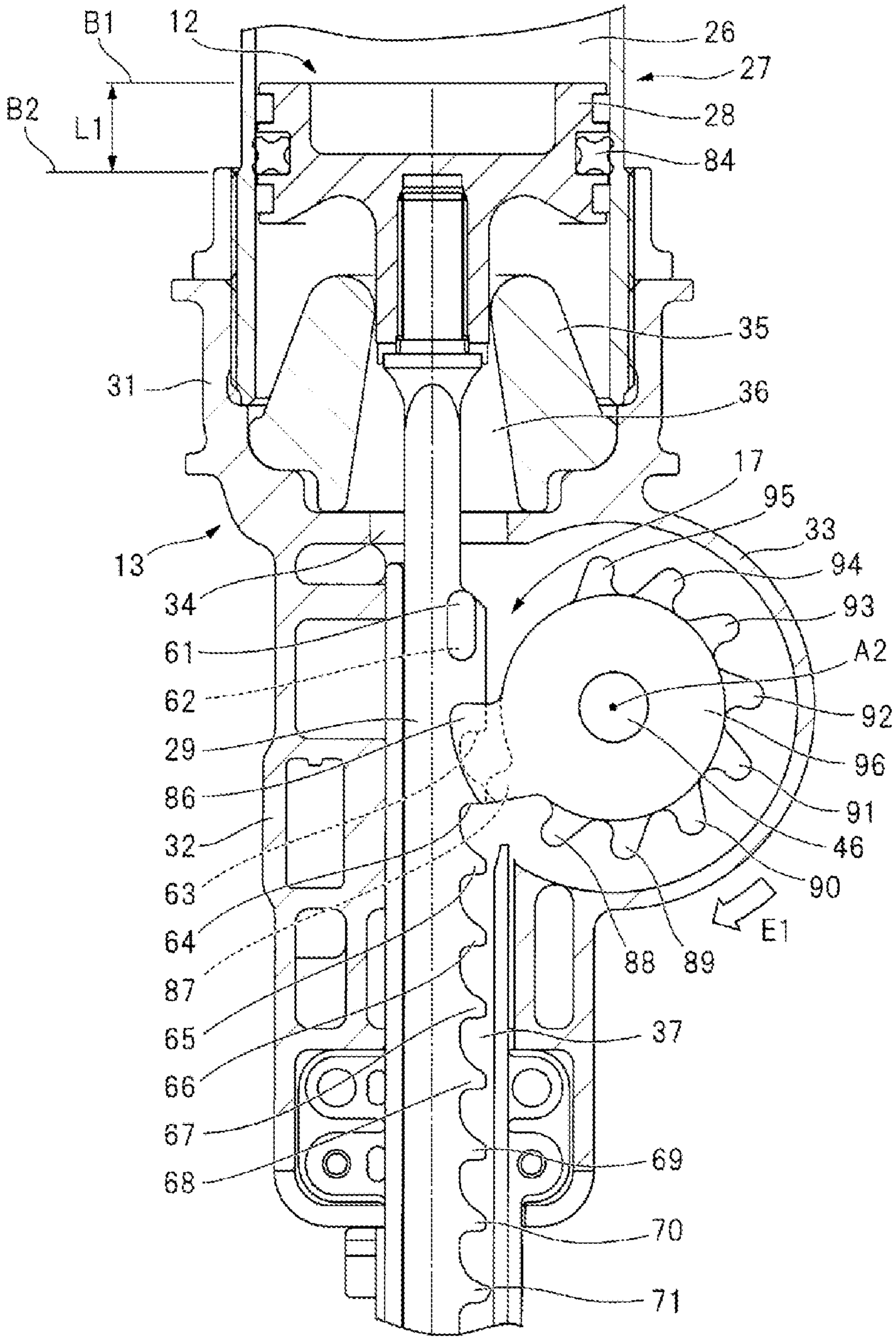
FIG. 11 is a back cross-sectional view showing the state in which the striking unit in FIG. 10 is located at an intermediate position.
Figure 12:
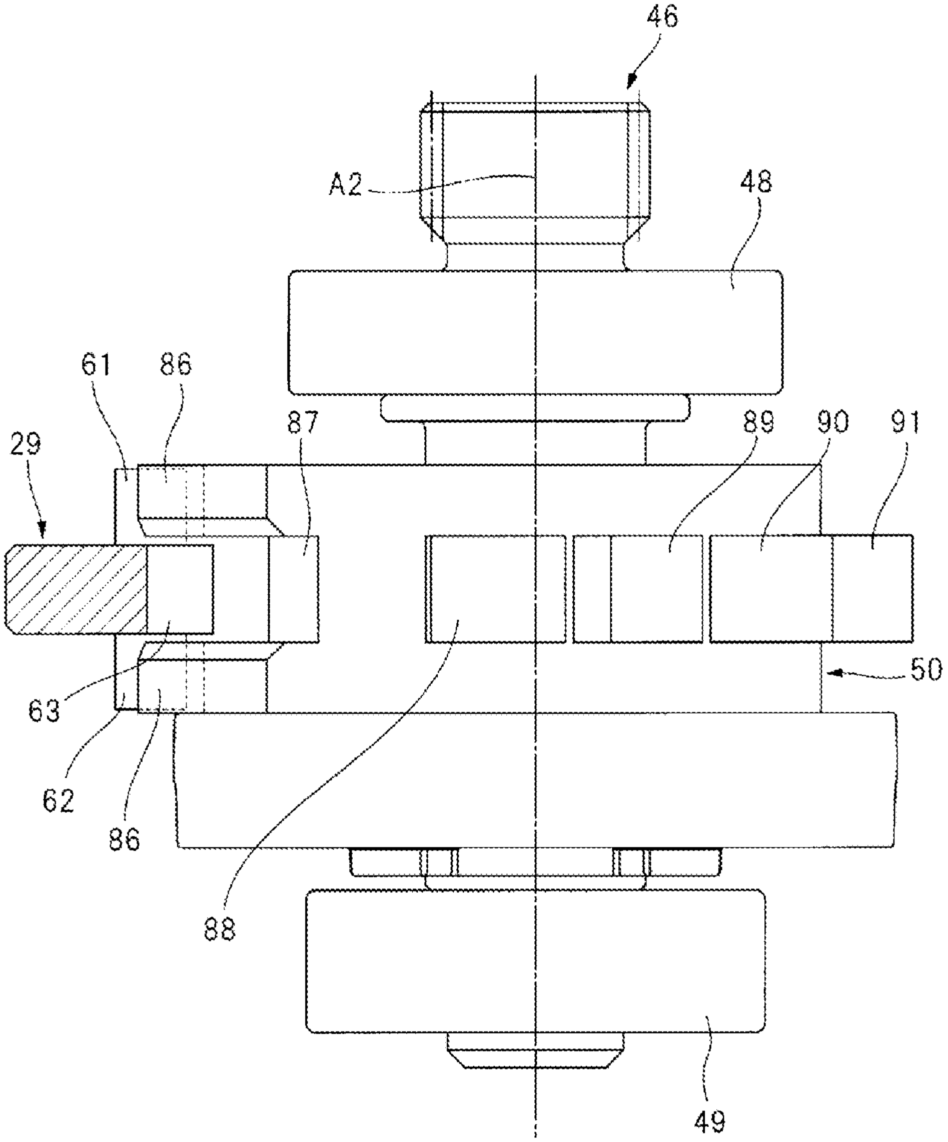
FIG. 12 is a bottom cross-sectional view of the adjustment mechanism shown in FIG. 10.

The second example of the adjustment mechanism 17 is shown in FIG. 10, FIG. 11, and FIG. 12. The configuration of the driver blade 29 is the same as that of the driver blade 29 of FIG. 4 and FIG. 5. A wheel 96 is a single disc fixed to the rotating shaft 46. The wheel 96 rotates clockwise around the center line A2 together with the rotation shaft 46. The wheel 96 has a plurality of second engaging portions 86, 87, 88, 89, 90, 91, 92, 93, 94, and 95 arranged at intervals in the rotation direction E1. The plurality of second engaging portions 86, 87, 88, 89, 90, 91, 92, 93, 94, and 95 is provided in this order along the rotation direction E1 of the wheel 96.

The second engaging portion 86 is located at the head, that is, at the first position in the rotation direction E1 while the wheel 96 makes one rotation. A single second engaging portion 86 is provided in the rotation direction E1 of the wheel 96. In the rotation direction of the wheel 96, the plurality of second engaging portions 87, 88, 89, 90, 91, 92, 93, 94, and 95 is located behind the second engaging portion 86. Therefore, when the wheel 50 rotates in the state where the striking unit 12 is stopped, the second engaging portion 86 of the plurality of second engaging portions first approaches the actuation region of the driver blade 29 in the rotation direction E1 of the wheel 96.

The plurality of second engaging portions 86, 87, 88, 89, 90, 91, 92, 93, 94, and 95 is teeth protruding outward from the outer peripheral surface of the wheel 96 in the radial direction of the wheel 96. The entire wheel 96 and the plurality of second engaging portions 86, 87, 88, 89, 90, 91, 92, 93, 94, and 95 can be defined as a gear. The plurality of second engaging portions 86, 87, 88, 89, 90, 91, 92, 93, 94, and 95 is provided integrally with the wheel 96.

The plurality of second engaging portions 86, 87, 88, 89, 90, 91, 92, 93, 94, and 95 is provided in the first region of approximately 270 degrees in the rotation direction E1 of the wheel 96. In the rotation direction E1 of the wheel 96, the second region other than the first region is approximately 90 degrees. The minimum outer diameter of the second region is smaller than the maximum outer diameter of the first region. The maximum outer diameter of the second region is the maximum outer diameter of the wheel 96. Two second engaging portions 86 are arranged at different positions in the direction along the center line A2. Namely, the second engaging portion 86 and the second engaging portion 86 are arranged at an interval in the direction along the center line A2.

In the direction along the center line A2, the plurality of second engaging portions 87, 88, 89, 90, 91, 92, 93, 94, and 95 is arranged between the second engaging portion 86 and the second engaging portion 86. Namely, the plurality of second engaging portions 87, 88, 89, 90, 91, 92, 93, 94, and 95 is arranged at different positions with respect to the two second engaging portions 86. In the rotation direction E1 of the wheel 96, the arrangement region of the second engaging portion 86 and the arrangement region of the second engaging portion 87 partially overlap with each other. In the direction along the center line A2, the driver blade 29 is arranged between the second engaging portion 86 and the second engaging portion 86. Further, in a plane perpendicular to the center line A2, the movement regions of the first engaging portions 61 and 62 and the movement regions of the two second engaging portions 86 overlap with each other. The movement regions of the first engaging portions 61 and 62 are those when the driver blade 29 is actuated. The movement regions of the two second engaging portions 86 are those when the wheel 96 is rotated.

In the second example of the adjustment mechanism 17, when the wheel 96 rotates clockwise in FIG. 10, the two second engaging portions 86 independently engage with and separate from the first engaging portions 61 and 62, respectively. Further, the second engaging portion 87 engages with and separates from the first engaging portion 63. The second engaging portion 88 engages with and separates from the first engaging portion 64. The second engaging portion 88 engages with and separates from the first engaging portion 65. The second engaging portion 89 engages with and separates from the first engaging portion 66. The second engaging portion 90 engages with and separates from the first engaging portion 67. The second engaging portion 91 engages with and separates from the first engaging portion 68. The second engaging portion 92 engages with and separates from the first engaging portion 68. The second engaging portion 93 engages with and separates from the first engaging portion 69. The second engaging portion 94 engages with and separates from the first engaging portion 70. The second engaging portion 95 engages with and separates from the first engaging portion 71.

From the time when the two second engaging portions 86 engage with the first engaging portions 61 and 62 to when the second engaging portion 95 separates from the first engaging portion 71, the striking unit 12 is actuated in the second direction D2. When the two second engaging portions 86 separate from the first engaging portions 61 and 62 and then the second engaging portion 95 engages with and separates from the first engaging portion 71, the striking unit 12 moves downward by the gas pressure of the pressure chamber 26. After the driver blade 29 strikes the nail 78, the striking unit 12 is stopped at the bottom dead center as shown in FIG. 10. All the second engaging portions 86, 87, 88, 89, 91, 92, 93, 94, and 95 are located in the movement region of the driver blade 29 while the striking unit 12 is moving downward. Therefore, in the process in which the striking unit 12 moves downward, the driver blade 29 does not come into contact with at least one of all the second engaging portions 86, 87, 88, 89, 91, 92, 93, 94, and 95.

When the nail 78 is jammed in the ejection path 37, the striking unit 12 is stopped at an intermediate position as shown in FIG. 11. Then, when the wheel 96 rotates clockwise, the two second engaging portions 86 independently engage with the first engaging portions 61 and 62, respectively. The driver blade 29 is located between the two second engaging portions 86 in the direction along the center line A2 as shown in FIG. 12.

Therefore, the two second engaging portions 86 do not engage with at least one first engaging portion, for example, the first engaging portion 63 and the first engaging portion 61. Namely, it is possible to prevent the second engaging portion 86 located at the head in the rotation direction E2 of the wheel 96 from engaging with the first engaging portion located behind the first engaging portions 61 and 62 located at the head in the second direction D2 of the striking unit 12, for example, the first engaging portion 63 or the first engaging portion 64.

Then, all the second engaging portions independently engage with and separate from the first engaging portions that are the original engagement targets, respectively. Further, in the process in which the striking unit 12 reaches the top dead center and the striking unit 12 moves downward, it is possible to prevent at least one of the first engaging portions from coming into contact with at least one of the second engaging portions. Therefore, it is possible to suppress the durability of at least one of the driver blade 29 and the wheel 96 from being lowered.

In addition, all the second engaging portions engage with and separate from the first engaging portions that are the original engagement targets, respectively, and the striking unit 12 reaches the top dead center. Therefore, the actuation amount of the striking unit 12 in the first direction D1 can be maintained to the maximum, and it is possible to prevent the striking force applied to the nail 78 from being insufficient. Also, in order to move the striking unit 12 upward by the rotational force of the wheel 96 when the striking unit 12 is stopped at the intermediate position, the lower ends of the first engaging portions 61 and 62 need to be located in the movement region of the second engaging portion 86 as a premise.

Figure 13:
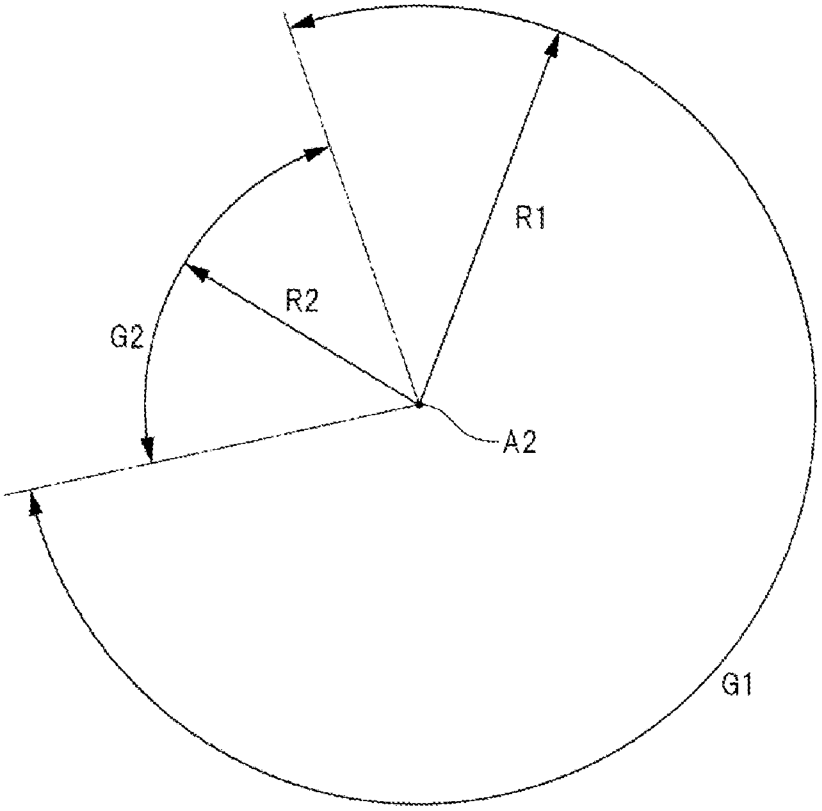
FIG. 13 is a schematic diagram showing a region in a rotation direction of a wheel provided in the driving tool.

FIG. 13 schematically shows a region in the rotation direction of the wheel. The wheel has a first region G1 and a second region G2 in the rotation direction around the center line A2. The first region G1 and the second region G2 occupy different regions in the rotation direction of the wheel. The first region G1 is a region in which all the second engaging portions are arranged. The second region G2 is a region in which the second engaging portions are not arranged. The first region G1 is about 90 degrees as an example, and the second region G2 is about 270 degrees as an example. The angles of the first region G1 and the second region G2 are determined by the number of the second engaging portions and the intervals between the second engaging portions, respectively. The minimum outer diameter R2 of the second region G2 in the wheel is smaller than the maximum outer diameter R1 of the first region G1 in the wheel. The maximum outer diameter R1 and the minimum outer diameter R2 are radii centered on the center line A2.

Examples of the technical meaning of the configurations disclosed in the embodiment are as follows. The first direction D1 is an example of a first direction, and the second direction D2 is an example of a second direction. The nail 78 is an example of a fastener. The striking unit 12 is an example of a striking unit. The striking unit 12 is actuated from the stand-by position to a first position and returns to the stand-by position via a second position while the wheel 50 or the wheel 96 makes one rotation. The driver blade 29 is an example of a driver blade. The pressure accumulator container 18 is an example of a biasing mechanism and a pressure accumulation container. The adjustment mechanism 17 is an example of an adjustment mechanism. The wheels 50 and 96 are examples of rotating portions, respectively. The first disc portion 50A is an example of a first disc portion. The second disc portion 50B is an example of a second disc portion.

The first engaging portions 61, 62, 63, 64, 65, 66, 67, 68, 69, 70, and 71 are examples of first engaging portions. The first engaging portions 61 and 62 are examples of specific first engaging portions. Further, the "specific first engaging portion located at the head in the second direction" is arranged at the position farthest from the tip of the striking unit in the actuation direction of the striking unit among the plurality of first engaging portions. The first engaging portions 63, 64, 65, 66, 67, 68, 69, 70, and 71 are examples of normal first engaging portions.

The second engaging portions 51, 52, 53, 54, 55, 56, 57, 58, 59, and 60 shown in FIG. 4 to FIG. 9 are examples of second engaging portions. The second engaging portion 51 is an example of a specific second engaging portion. The second engaging portions 52, 53, 54, 55, 56, 57, 58, 59, and 60 are examples of normal second engaging portions.

The second engaging portions 86, 87, 88, 89, 90, 91, 92, 93, 94, and 95 shown in FIG. 10 to FIG. 12 are examples of second engaging portions. The second engaging portion 86 is an example of a specific second engaging portion. The second engaging portions 87, 88, 89, 90, 91, 92, 93, 94, and 95 are examples of normal second engaging portions.

The center line A2 is an example of a rotation center line. The first region G1 is an example of a first region. The second region G2 is an example of a second region. The rotation direction E1 is an example of a rotation direction. The maximum outer diameter R1 is an example of a maximum outer diameter, and the minimum outer diameter R2 is an example of a minimum outer diameter.

The driving tool is not limited to the embodiment described above and can be variously modified within the range not departing from the gist thereof. For example, the stand-by position of the striking unit may be the bottom dead center in the state where the piston is in contact with the bumper. Further, the bumper that absorbs part of the kinetic energy of the striking unit may be made of silicone rubber other than synthetic rubber. Also, the bumper may be an air bumper.

In addition, the biasing mechanism for actuating the striking unit in the first direction may be a solid spring, a synthetic rubber, or a magnetic spring other than the pressure accumulation container filled with compressible gas. Examples of the solid spring include a metal compression spring or a tension spring. The solid spring and the synthetic rubber actuate the striking unit in the first direction by the elastic restoring force. The magnetic spring actuates the striking unit in the first direction by the repulsive force between the magnets having the same polarity.

The power source unit that applies a voltage to the electric motor may be either a DC power source or an AC power source. As the motor that actuates the striking unit in the second direction, any one of a hydraulic motor, a pneumatic motor, and an engine can be used instead of the electric motor.

Further, "the first engaging portion and the second engaging portion engage with each other" means that the rotational force of the rotating portion is transmitted to the striking unit. Also, "the first engaging portion and the second engaging portion are separated from each other" can be defined as "the first engaging portion and the second engaging portion are released from each other". Namely, the separation or release of the first engaging portion and the second engaging portion means the state in which the rotational force of the rotating portion is not transmitted to the striking unit. Further, the first engaging portion and the second engaging portion may have any shape as long as they can engage with and separate from each other. For example, the first engaging portion may have a pin shape, and the second engaging portion may be a protruding portion provided on the outer peripheral surface of the wheel. A plurality of first engaging portions provided on the striking unit can be defined as a rack. A plurality of second engaging portions provided on the rotating portion can be defined as a pinion.

Further, the number of the first engaging portions and the number of the second engaging portions are not limited as long as they are the same. The number of the first engaging portions and the number of the second engaging portions may be less than 10, or more than 10, respectively. Further, the region in the rotation direction of the rotating portion can be defined as a range in the rotation direction. For convenience, the rotation direction of the rotating portion in the case where the striking unit is actuated in the second direction is shown as the clockwise rotation direction E1 in each figure. On the other hand, the rotation direction of the rotating portion in the case where the striking unit is actuated in the second direction may be counterclockwise.

REFERENCE SIGNS LIST

10 . . . driving tool, 12 . . . striking unit, 15 . . . electric motor, 17 . . . adjustment mechanism, 18 . . . pressure accumulation container, 29 . . . driver blade, 50, 96 . . . wheel, 50A . . . first disc portion, 50B . . . second disc portion, 51, 52, 53, 54, 55, 56, 57, 58, 59, 60 . . . second engaging portion, 61, 62, 63, 64, 65, 66, 67, 68, 69, 70, 71 . . . first engaging portion, A2 . . . center line, D1 . . . first direction, D2 . . . second direction, E1 . . . rotation direction, G1 . . . first region, G2 . . . second region, R1 . . . maximum outer diameter, R2 . . . minimum outer diameter

The invention claimed is:

1. A driving tool comprising:

a striking unit operable to move from a first position to a second position to strike a fastener;

a rotating portion configured to rotate around an axis of the rotating portion to move the striking unit from the second position to the first position;

a plurality of first engaging portions arranged at intervals on the striking unit; and a plurality of second engaging portions arranged at intervals on the rotating portion and configured to individually engage with and disengage from respective ones of the first engaging portions to move the striking unit as the rotating portion rotates, wherein the plurality of first engaging portions includes:

normal first engaging portions that are arranged along a first direction in which the striking unit extends; and at least one specific first engaging portion that is positioned in a different location from the normal first engagement portions along the axis of the rotating portion, wherein the plurality of second engaging portions includes:

normal second engaging portions that are arranged along a rotating direction of the rotating portion and that engage only with the normal first engaging portions, and at least one specific second engaging portion that is positioned in a different location from the normal second engaging portions along the axis of the rotating portion and that engages only with the at least one specific first engaging portion, and wherein the at least one specific second engaging portion overlaps with the at least one specific first engaging portion along the axis of the rotating portion, and the at least one specific second engaging portion does not overlap with any of the normal first engaging portions along the axis of the rotating portion.

2. The driving tool according to claim 1, wherein the at least one specific first engaging portion comprises two specific first engaging portions, one of the two specific first engaging portions extends from the striking unit in a second direction perpendicular to the first direction in which the striking unit extends, and another of the two specific first engaging portion extends from the striking unit in a third direction opposite the second direction, and wherein the at least one specific second engaging portion comprises two specific second engaging portions that engage with the two specific first engaging portions, respectively.

3. The driving tool according to claim 1, wherein the rotating portion includes a first disc portion and a second disc portion arranged at different positions in a direction along a rotation center line of the rotating portion, and wherein the normal second engaging portions are arranged between the first disc portion and the second disc portion.

4. The driving tool according to claim 1, wherein the normal second engaging portions protrude outward from an outer peripheral surface of the rotating portion in a radial direction of the rotating portion.

5. The driving tool according to claim 1, wherein the number of the plurality of first engaging portions and the number of the plurality of second engaging portions are the same.

6. The driving tool according to claim 1, wherein the rotating portion includes:

a first region in which the plurality of second engaging portions is provided in the rotation direction of the rotating portion; and a second region in which the plurality of second engaging portions is not provided in the rotation direction, and wherein the at least one specific second engaging portion is located at a head of the plurality of second engaging portions in the first region in the rotation direction of the rotating portion.

7. The driving tool according to claim 6, wherein the rotating portion includes a guide portion, and wherein the normal second engaging portion located at the head of the plurality of normal second engaging portions in the first region in the rotation direction of the rotating portion is configured to change a position in a radial direction of the rotating portion.

8. The driving tool according to claim 6, wherein a minimum outer diameter of the second region is smaller than a maximum outer diameter of the first region in a radial direction of the rotating portion.

9. The driving tool according to claim 1, further comprising:

a biasing mechanism configured to move the striking unit from the first position to the second position; and a bumper configured to come into contact with the striking unit moving from the first position and to stop the striking unit at the second position.

10. The driving tool according to claim 9, wherein the biasing mechanism is a pressure accumulation container in which compressible gas to bias the striking unit toward the second position is filled, wherein a pressure of the compressible gas increases when the striking unit moves from the first position to the second position, and wherein the striking unit moves from the first position to the second position by the pressure of the compressible gas when the plurality of first engaging portions is all separated from the plurality of second engaging portions.

11. A driving tool comprising:

a striking unit operable to move from a first position to a second position to strike a fastener;

a rotating portion configured to rotate around an axis of the rotating portion to move the striking unit from the second position to the first position;

a plurality of first engaging portions arranged at intervals on the striking unit; and a plurality of second engaging portions arranged at intervals on the rotating portion in a rotating direction and configured to individually engage with and disengage from respective ones of the first engaging portions to move the striking unit as the rotating portion rotates, wherein the plurality of first engaging portions includes:

at least one specific first engaging portion; and normal first engaging portions that are arranged with a direction in which the striking unit extends, the at least one specific first engaging portion is positioned in a different location from the normal first engagement portions along the axis of the rotation portion, wherein the plurality of second engaging portions includes:

at least one specific second engaging portion that engages only with the at least one specific first engaging portion when the rotating portion rotates in a state where the striking unit is stopped at the second position; and normal second engaging portions that are arranged along the rotating direction of the rotating portion, and that engage only with the normal first engaging portions, the at least one specific second engaging portion is positioned in a different location from the normal second engaging portions along the axis of the rotation portion, wherein the driving tool further comprises an adjustment mechanism, which makes the at least one specific second engaging portion engage with the at least one specific first engaging portion and makes the normal second engaging portions engage with the normal first engaging portions when the rotating portion is rotated in a state where the striking unit is stopped between the first position and the second position, and wherein the at least one specific second engaging portion overlaps with the at least one specific first engaging portion along the axis of the rotating portion, and the at least one specific second engaging portion does not overlap with any of the normal first engaging portions along the axis of the rotating portion, with the at least one specific second engaging portion passing by the normal first engaging portions without engaging with them before engaging with the at least one specific first engaging portion.

12. A driving tool comprising:

a striking unit operable to move from a first position to a second position to strike a fastener;

a rotating portion configured to rotate around an axis of the rotating portion to move the striking unit from the second position to the first position;

a plurality of first engaging portions arranged at intervals on the striking unit; and a plurality of second engaging portions arranged at intervals on the rotating portion and configured to individually engage with and disengage from respective ones of the first engaging portions to move the striking unit as the rotating portion rotates, wherein the plurality of first engaging portions includes:

normal first engaging portions that are arranged along a first direction in which the striking unit extends; and at least one specific first engaging portion that is positioned in a different location from the normal first engagement portions along the axis of the rotating portion;

wherein the plurality of second engaging portions includes:

normal second engaging portions that are arranged along a rotating direction of the rotating portion and that engage only with the normal first engaging portions; and at least one specific second engaging portion that is positioned in a different location from the normal second engaging portions along the axis of the rotating portion and that engages only with the at least one specific first engaging portion; and wherein one of the normal second engaging portions is overlapped with corresponding one of the normal first engaging portions along the axis of the rotating portion, and the normal second engaging portion is not overlapped with the at least one specific first engaging portion along the axis of the rotating portion.

* * * * *